United States Patent [19]
Uemura et al.

[11] Patent Number: 6,128,100
[45] Date of Patent: Oct. 3, 2000

[54] IMAGE FORMING APPARATUS AND METHOD FOR ASSEMBLING THE SAME

[75] Inventors: Takeshi Uemura; Masahiro Hashizume; Shinichi Tanaka, all of Osaka, Japan

[73] Assignee: Kyocera Mita Corporation, Osaka, Japan

[21] Appl. No.: 08/967,424

[22] Filed: Nov. 10, 1997

[30] Foreign Application Priority Data

Nov. 12, 1996 [JP] Japan .................................. 8-300461

[51] Int. Cl.⁷ ..................................................... H04N 1/04
[52] U.S. Cl. .......................................................... 358/401
[58] Field of Search .................................... 358/400, 401, 358/498, 497, 496; 271/264; 355/407, 48, 50

[56] References Cited

U.S. PATENT DOCUMENTS

| | | | |
|---|---|---|---|
| 4,229,085 | 10/1980 | Yamada | 353/75 |
| 4,989,099 | 1/1991 | Koshiyouji | 358/474 |
| 5,313,257 | 5/1994 | Kashima et al. | 355/309 |
| 5,475,211 | 12/1995 | Ogura | 250/208.01 |
| 5,546,161 | 8/1996 | Sakai | 355/200 |
| 5,581,076 | 12/1996 | Tabata | 250/208.1 |
| 5,589,918 | 12/1996 | Oshida | 399/114 |
| 5,731,116 | 3/1998 | Matsuo | 430/56 |
| 6,029,019 | 2/2000 | Kawai | 399/13 |

*Primary Examiner*—Jerome Grant, II
*Attorney, Agent, or Firm*—Jordan and Hamburg LLP

[57] ABSTRACT

This invention relates to an image forming apparatus and a method for assembling the apparatus. A main body of the image forming apparatus has a frame main body consisting of an optical frame and a chassis made of a resin (resin chassis). Mounting an image recorder unit on the resin chassis improves the precision in mounting the image recorder unit, while the optical frame assuring the rigidity of the apparatus as a whole. The resin chassis consisting part of the frame main body reduces the production cost of the frame main body, in turn, reducing the production cost on the final product, i.e., image forming apparatus.

19 Claims, 5 Drawing Sheets

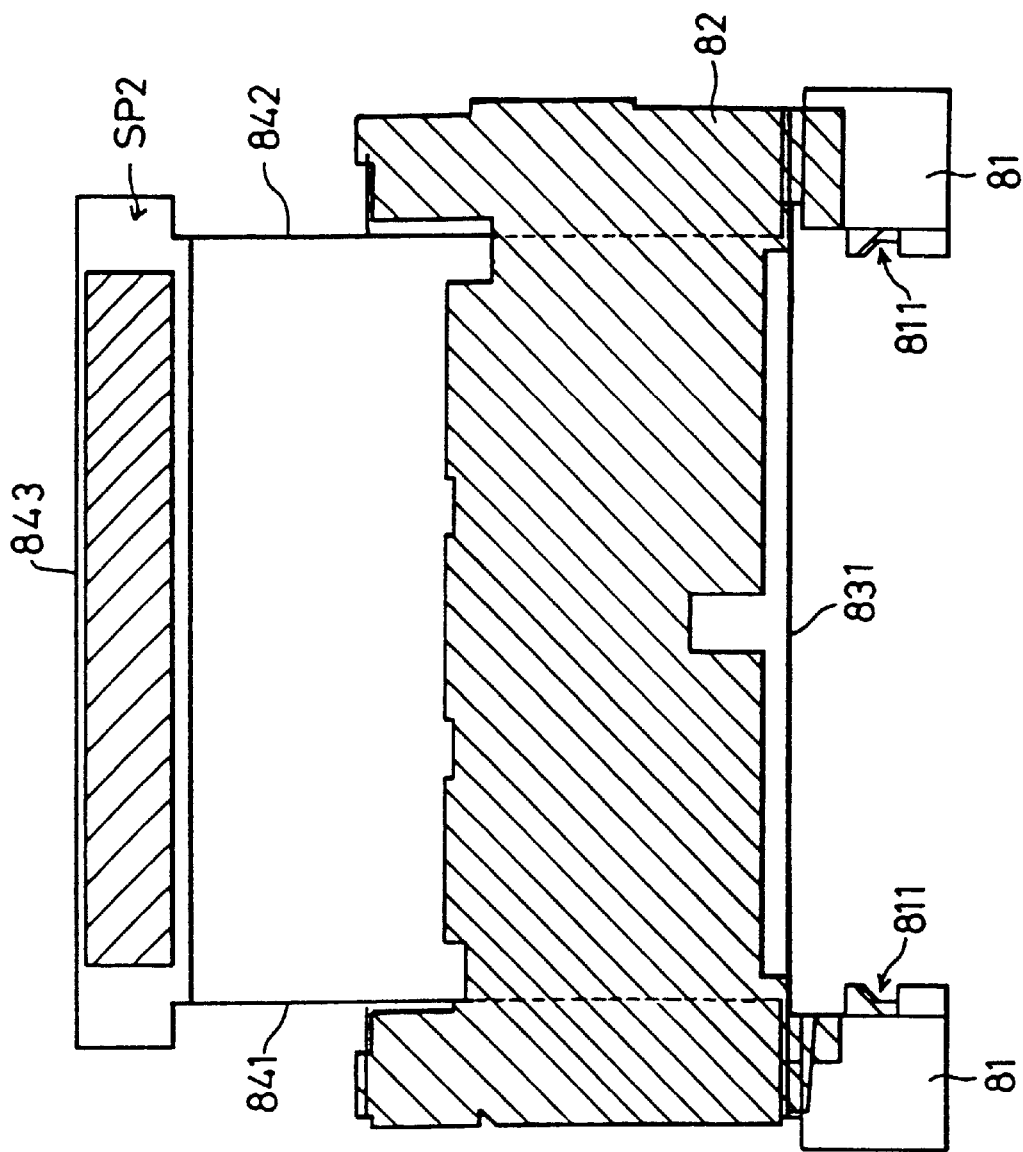

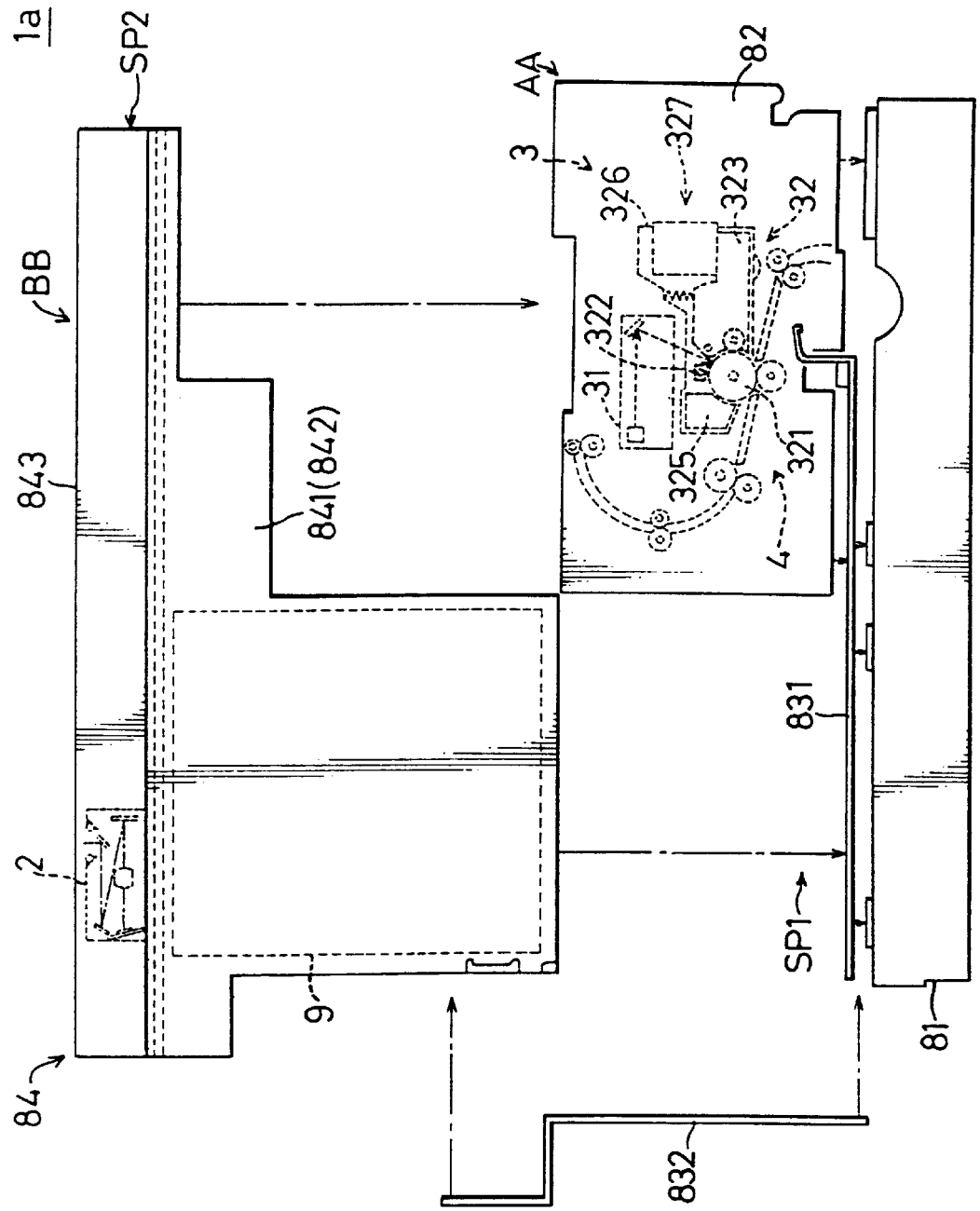

IMAGE FORMING APPARATUS AND METHOD FOR ASSEMBLING THE SAME

BACKGROUND OF THE INVENTION

1. Field of the Invention

This invention relates to an image forming apparatus and a method for assembling the apparatus. The image forming apparatus in this description is, e.g., a copying machine or a compound machine having various functions as copying machine, facsimile machine, printer, and scanner. The image forming apparatus has an image reader unit for reading an original image, and an image recorder unit for recording the image on a copy sheet based on image data read by the image reader unit or image data transmitted from an external device (such as facsimile machine).

2. Description of the Background Art

Generally, there have been known image forming apparatuses constructed in the following manner. First, a frame main body for the apparatus is constructed by assembling plural sheet metal products produced by a sheet metal working. Then, an image reader unit and an image recorder unit are mounted on the frame main body to obtain a main body of the apparatus. Further, a contact glass for setting an original document thereon is mounted at the top of the apparatus main body, and an original document presser for covering the entire plane of the contact glass is openably mounted on the apparatus main body.

Mounting the image recorder unit on the frame main body needs high precision. However, the conventional apparatus constructed in the above manner could not meet the demand for high-precision mounting because the image recorder unit was mounted on the frame main body constructed by assembling various sheet metal products. Accordingly, it took a long time to mount the image recorder unit on the frame main body of the conventional apparatus with high precision.

Further, since the frame main body is constructed by assembling various sheet metal products, the frame main body itself becomes rather expensive. This becomes one of the reasons for cost rise on the final product, image forming apparatus.

The conventional image forming apparatus also suffers from another drawback. All the components constituting the image forming apparatus need to be mounted on the single frame main body one by one according to the order. Accordingly, further the mounting step proceeds, more complicated the mounting operation that follows becomes. In addition, a series of mounting operations must be performed chronologically, resulting in lowering the mounting workability of the image forming apparatus.

SUMMARY OF THE INVENTION

In view of the above drawbacks residing in the prior art, an object of this invention is to provide an image forming apparatus that enables reduction of production cost as well as improving precision in mounting an image recorder unit on a frame main body by constructing the frame main body with components made of a suitable material considering the functions thereof.

It is another object of this invention to provide a method for assembling the image forming apparatus that assures high mounting workability.

To accomplish the above objects, an image forming apparatus comprising: a frame main body including an optical frame made of plural sheet metal products produced by a sheet metal working, and a resin chassis produced by a resin molding process; an image reader unit mounted on the optical frame for reading an image of an original document; and an image recorder unit mounted on the resin chassis for recording the image on a copy sheet based on image data read by the image reader unit or based on image data transmitted from an external device.

According to this invention, the frame main body is composed of the optical frame and the chassis made of a resin (resin chassis) to mount various parts (image reader unit, image recorder unit, etc.) constituting the image forming apparatus. The optical frame assures the rigidity of the apparatus as a whole. On the other hand, mounting the image recorder unit on the resin chassis improves the precision in mounting the image recorder unit. Since part of the frame main body is composed of the resin, the production cost regarding the frame main body itself can be reduced.

The above and other objects, features and advantages of the present invention will become more apparent upon a reading of the following detailed description and drawings.

BRIEF DESCRIPTION OF THE DRAWINGS

FIG. 4 is a front view of the apparatus main body when viewed from the direction of arrow A in FIG. 3; and FIG. 5 is an exploded diagram of the apparatus main body before assembling.

DETAILED DESCRIPTION OF THE PREFERRED EMBODIMENTS OF THE INVENTION

Hereinafter, an image forming apparatus embodying this invention is described, first on various parts constituting the apparatus, then, a construction of a frame main body for mounting the above various parts, and last as to how the parts are mounted on the frame main body, with reference to the accompanying drawings.

Figure 1:
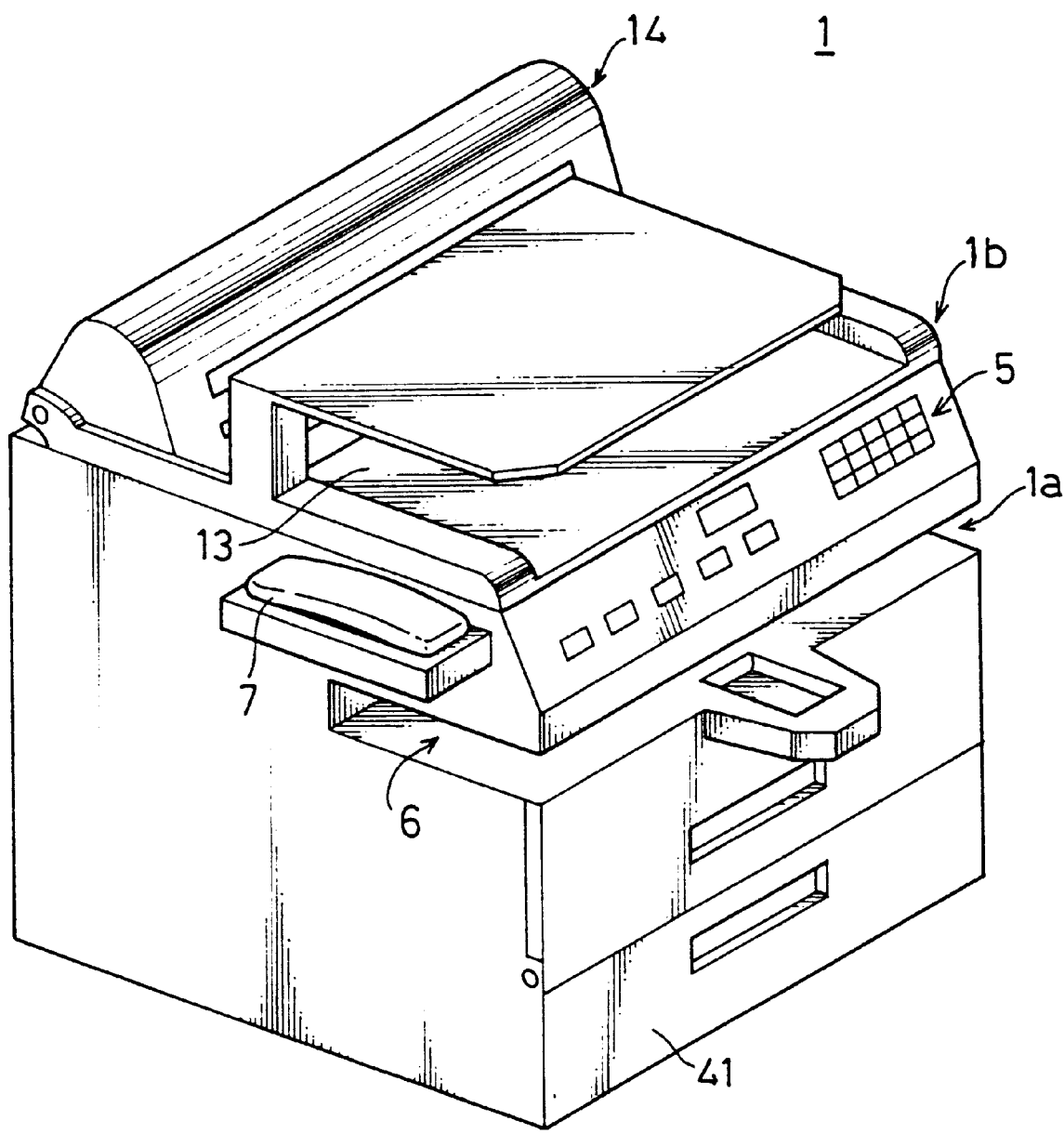
FIG. 1 is a perspective view showing an external appearance of an image forming apparatus as an embodiment according to this invention.

FIG. 1 is a perspective view showing an external appearance of the image forming apparatus as one embodiment.

Figure 2:
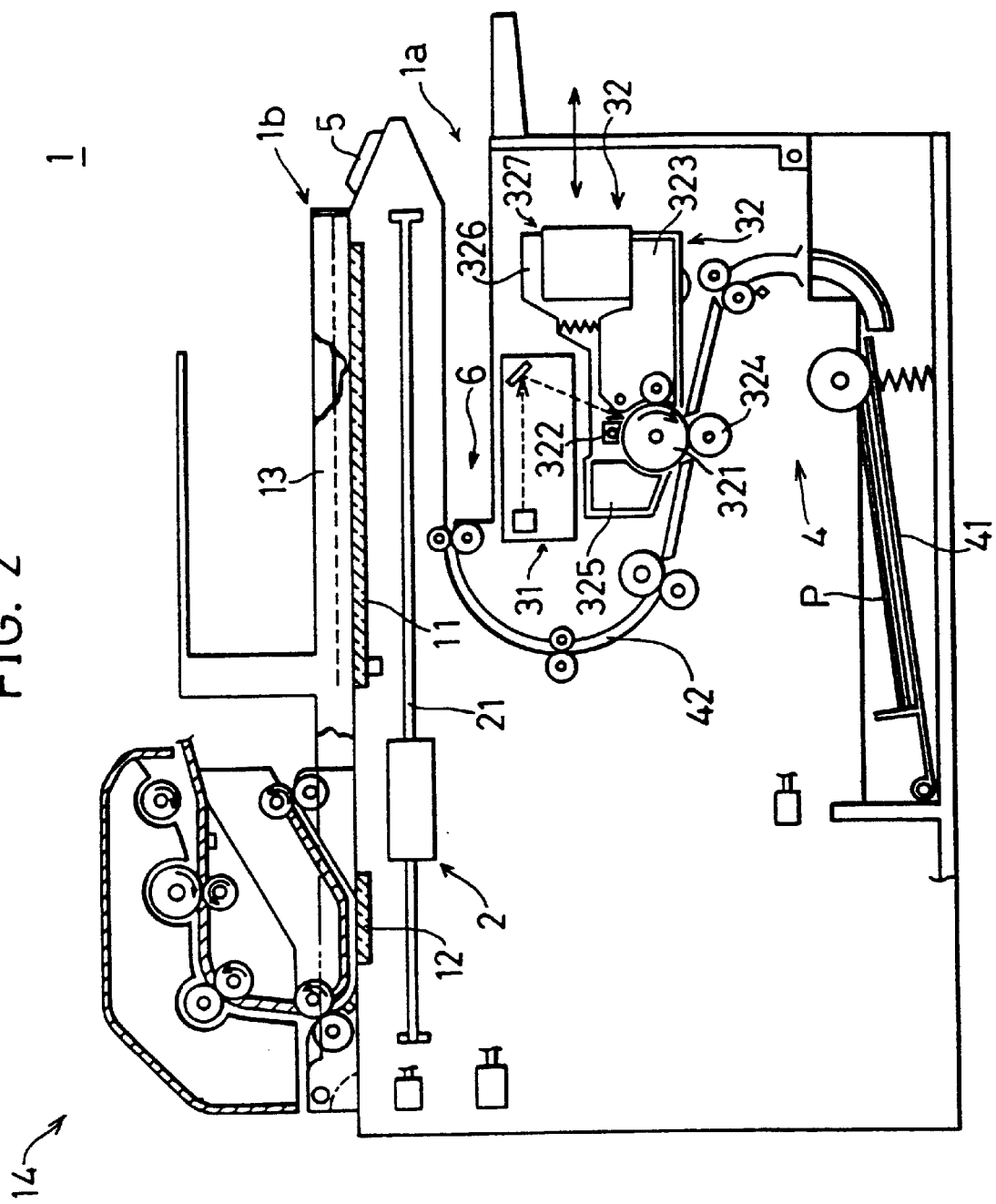
FIG. 2 is a diagram showing an internal arrangement of the image forming apparatus.

FIG. 2 is a diagram showing an internal arrangement of the image forming apparatus. The image forming apparatus 1 is a compound machine having various functions as copying machine, facsimile machine, printer, and image scanner.

The apparatus 1 comprises an apparatus main body 1a, and a document handling unit 1b disposed on the apparatus main body 1a. The document handling unit 1b is designed such that an image reader 2 reads the image of an original document either by setting the document in a stationary state or by feeding the document.

The document handing unit 1b has a first contact glass 11 mounted at the top of the apparatus main body 1a, a second contact glass 12 mounted on the rear side (left side in FIG. 2) of the first contact glass 11, a document presser 13 disposed above the first contact glass 11 for covering the entire plane of the first contact glass 11 when closed, and an automatic document feeder 14 disposed above the second contact glass 12.

The image scanner 2 (functioning as image reader unit) is selectively operated such that it reads the image of an original document while moving relative to the document when the document is set on the contact glass 11 in a stationary state. On the other hand, when the original document is placed on the document feeder 14, the image scanner 2 reads the original image by feeding the document by rollers comprising the automatic document feeder 14, while pausing at a specified image scan position just below the second contact glass 12.

An operation panel 5 is arranged on the upper outer surface, on the front side (right side in FIG. 1) of the apparatus main body 1a. A copy sheet discharge unit 6 is provided on the upper portion of the apparatus main body 1a, extending half way through in a direction from the front side where the operation panel 5 is provided toward the rear side of the apparatus main body. A telephone 7 is provided on the side portion of the apparatus main body 1a to transmit and receive an image data to and from a facsimile machine (external device) via a telephone line.

It should be noted that, in this embodiment, copying operation and facsimile transmission/receiving are supposed to be performed on the side of the operation panel 5. Accordingly, the side where the operation panel 5 is provided is referred to as "front side" of the apparatus main body, whereas the opposite side is referred to as "rear side" throughout the description.

The apparatus main body 1a is internally provided with the image scanner (image reader unit) 2, an image recorder unit 3, and a copy sheet transport mechanism 4 that are assembled on a frame main body 8. The frame main body 8 comprises a cassette rail 81, a main body mounting plate 831, a chassis 82 made of a resin material (simply referred to as "resin chassis"), an optical frame 84, and a rear cover 832.

The image scanner 2 is disposed beneath the first contact glass 11 and the second contact glass 12, and is designed to read a stationary original image while reciprocating relative to the original document and to read the image of an original document fed by the automatic original feeder 14 while pausing at the scan position just below the second contact glass 12.

As shown in FIG. 2, the image recorder unit 3 has an exposure unit 31 for exposing an image read by the image scanner 2 or an image (data) transmitted from an externally provided facsimile machine (external device), and an imaging assembly 32 with a photoreceptor 321. The exposure unit 31 is disposed below the copy sheet discharge unit 6 to form an electrostatic latent image on the photoreceptor 321 based on the image data (image read by the image scanner) or the image data transmitted from the external device.

The imaging assembly 32 has a charger 322, a developing unit 323, a transfer roller 324, and a cleaning unit 325 along a circumference of the photoreceptor 321. The electrostatic latent image formed on the photoreceptor 321 is developed into a toner image by the developing unit 323. Thereafter, the toner image is transferred onto a copy sheet P transported by the copy sheet transport mechanism 4 at a position opposing to the transfer roller 324.

Toner residues on the surface of the photoreceptor 321 are removed by the cleaning unit 325 at a position opposing thereto. The charger 322, the developing unit 323, and the cleaning unit 325 which constitute part of the imaging assembly 32 are accommodated in a housing 326 to constitute an imaging unit 327 as a whole. The imaging unit 327 is detachably mounted on the resin chassis 82 provided in the apparatus main body 1a.

The transport mechanism 4 is designed such that a copy sheet P is fed from a paper cassette 41 provided in the lower portion of the apparatus main body 1a, transported along a substantially S-shaped transport path toward the photoreceptor 321, and then is discharged to the copy sheet discharge unit 6.

Figure 3:
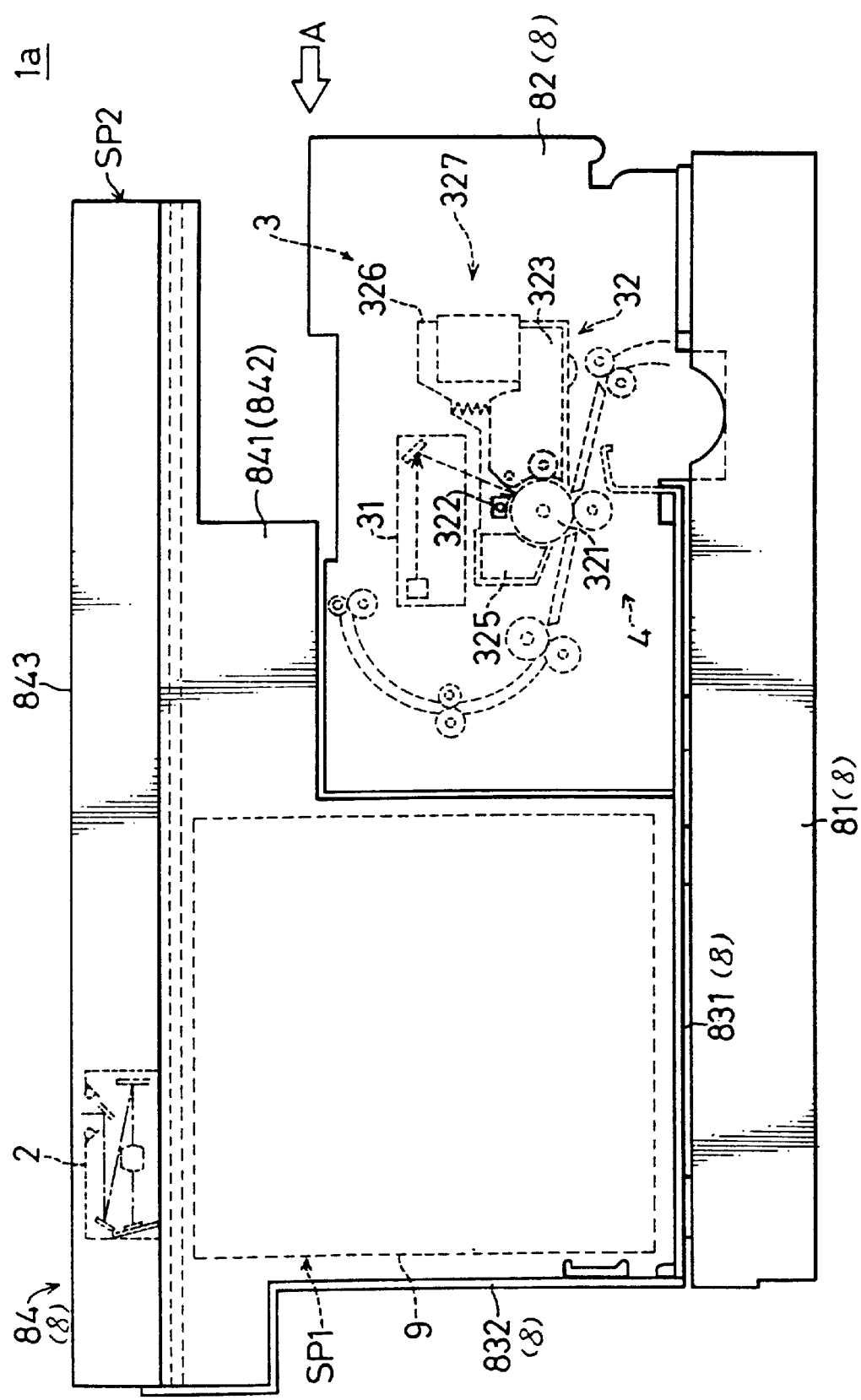
FIG. 3 is a diagram showing an assembled state of a frame main body provided in a main body of the apparatus, an image scanner (image reader unit) mounted on the frame main body, and an image recorder unit.

Next, described is how the above parts constituting the image forming apparatus are mounted on the frame main body 8. FIG. 3 is a diagram showing how the image scanner 2 and the image recorder unit 3 are mounted on the frame main body 8 provided in the apparatus main body 1a. FIG. 4 is a front view of the apparatus main body 1a when viewed from the front side (direction shown by arrow A in FIG. 3). FIG. 5 is an exploded diagram of the apparatus main body 1a before assembling.

As shown in FIGS. 3 to 5, the frame main body 8 has the cassette rail 81, the resin chassis 82, the main body mounting plate 831 (simply referred to as "mounting plate"), the rear cover 832, and the optical frame 84. The cassette rail 81 and the resin chassis 82 are produced according to a resin molding process. The mounting plate 831 and the rear cover 832 are produced according to a sheet metal working. The optical frame 84 is constructed by assembling plural sheet metal products produced by the sheet metal working.

The cassette rail 81 has a pair of guide members 811 and 811, and is detachably mounted on the paper cassette 41 along the guide members 811 and 811 (see FIG. 4).

The resin chassis 82 is mounted on the cassette rail 81. The image recorder unit 3 and the copy sheet transport mechanism 4 are mounted on the resin chassis 82. The chassis 82 is a one-piece member obtained by e.g., injecting a resin material into a mold fabricated by precision machining. Those connecting (engaging) portions of the chassis 82 (such as recess, cutaway, and projection) are so designed that those portions especially are formed according to a mold process with higher dimensional precision in order to precisely mount the image recorder unit 3 and the transport mechanism 4 on the chassis 82. The constituent elements of the image recorder unit 3 (e.g., exposure unit 31 and imaging assembly 32) are mounted on the chassis 82 having the high dimensional precision to thereby improve the precision in mounting the image recorder unit 3 as a whole.

In this embodiment, the chassis 82 is provided with a guide member (not shown) for guiding the housing 326 to enable detachable mounting of the imaging unit 327 (one-piece unit) comprising the housing 326, the charger 322, the developing unit 323 and the cleaning unit 325 on the chassis 82. Thereby, replacement of the imaging unit 327 can be facilitated.

Besides the chassis 82, the mounting plate 831 is mounted on the cassette rail 81, on the rear portion of the chassis 82. The rear cover 832 is mounted on the mounting plate 831 from the rear side of the apparatus main body 1a, and side plates 841 and 842 constituting the optical frame 84 are mounted on the upper portion of the apparatus main body 1a. The mounting plate 831, the rear cover 832, and the side plates 841 and 842 define a base housing portion (space) SP1. A controller 9 is set inside the space SP1.

The controller 9 has a base loaded with electronic parts that control various parts (such as image scanner 2 and image recorder unit 3) of the image forming apparatus 1. Thus, in this embodiment, the electronic parts, which are easily influenced by noise, are shielded by the mounting plate 831, the rear cover 832 and the side plates 841 and 842 all of which have been produced by a sheet metal working.

Thereby, resistance to an adverse effect of noise can be enhanced, and an erroneous operation of the image forming apparatus can be effectively prevented.

The optical frame 84 has a casing 843 mounted at the top of the side plates 841 and 842. The casing 843 has a parallelepiped with a hollow (internal space SP2) inside. A guide member (not shown) is provided in the casing 843. The image scanner 2 reciprocates along the guide member in the internal space SP2 of the casing 843. Two openings (not shown) are formed on the upper surface of the casing 843. The contact glasses 11 and 12 are respectively mounted in the openings.

To sum it all up, according to the image forming apparatus in this embodiment, the frame main body 8 of the apparatus main body 1a comprises the following parts:

the cassette rail 81 and the chassis 82 produced by a resin molding process;

the mounting plate 831 and the rear cover 832 produced by a sheet metal working; and the optical frame 84 constructed by assembling plural sheet metal products produced by the sheet metal working.

In this way, a resin product is used as part of the frame main body 8 to thereby reduce the production cost of the frame main body 8. Consequently, the production cost on the final product, image forming apparatus 1, is reduced.

Further, similar to the prior art apparatus, part of the frame main body 8 such as the optical frame 84 is produced by a sheet metal working. Accordingly, the rigidity of the frame main body 8 itself is maintained at a high level.

The image forming apparatus according to this invention is assembled in the following manner:

assembling plural sheet metal products produced by a sheet metal working to form the optical frame 84 in the step a);

forming the resin chassis 82 according to a resin molding process in the step b);

while mounting the image scanner 2 on the optical frame 84 to obtain a structural member BB in the step c), mounting the image recorder unit 3 on the chassis 82 to obtain a structural member BB in the step d); and finally as shown in FIG. 5, assembling the structural members AA and BB to produce the final product, image forming apparatus 1, while fixedly mounting the controller 9 on the mounting plate 831 in the step e).

In this embodiment, the step c) and the step d) are independently performed from each other; therefore, both steps are carried out simultaneously. Thereby workability in assembling the image forming apparatus is remarkably improved.

According to the assembling method of this invention, the step c) can be carried out irrespective of the assembling progress status of the step d), or vice versa. Accordingly, compared to the conventional assembling method in which the parts are assembled on the single frame main body produced by a sheet metal working step by step, efficient and simple mounting operation can be ensured.

In this embodiment, prior to the final step e), all the components constituting the image recorder unit 3 are mounted on the chassis 82 to produce the structural member BB. Alternatively, after the final step e) is completed, the imaging unit 327, detachably mountable to the apparatus main body 1a, may be mounted on the apparatus main body.

In this embodiment, the photoreceptor 321 and the cleaning unit 325 are fixed on the chassis 82. However, the same effect as mentioned above can also be obtained for an image forming apparatus with the imaging unit 327 in which the parts 321 and 325 are mounted integrally with the charger 322 and the developing unit 323. With this imaging unit 327, similarly, the final assembling step may be performed after the imaging unit 327 has already been mounted on the chassis 82, or vice versa.

The foregoing embodiment describes the case where the present invention is applied to the image forming apparatus (compound machine) having functions as copying machine, facsimile machine, printer, and image scanner. However, the present invention is not limited to the compound machine such as shown in this embodiment, and may be applicable to an image forming apparatus provided solely with a copying function of recording an image read by an scanner (image reader unit) onto a copy sheet by an image recorder unit. Further, it is needless to say that this invention is applicable to a copying machine having a function of copy/print, and a compound machine having a function of copy/facsimile/image scan.

Although the present invention has been fully described by way of example with reference to the accompanying drawings, it is to be understood that various changes and modifications will be apparent to those skilled in the art. Therefore, unless otherwise such change and modifications depart from the scope of the invention, they should be construed as being included therein.

What is claimed is:

1. An image forming apparatus comprising:

a frame main body including a metal frame made of sheet metal and a resin chassis made of resin material, the resin chassis being formed into one body by a resin molding process;

an image reader unit mounted on the metal frame for reading an image of an original document;

an image recorder unit on the resin chassis for recording the image on a copy sheet based on image data read by the image reader unit and a copy sheet transport mechanism for transporting a copy sheet;

the resin chassis including a portion for supporting the image recorder unit and a portion for supporting the copy sheet transport mechanism;

whereby the metal frame provides enhanced strength and rigidity fo the image forming apparatus and the resin chassis provides enhanced dimensional accuracy in supporting the image recorder and the copy sheet transport mechanism.

2. The image forming apparatus according to claim 1, wherein:

the frame main body further includes a main body mounting plate made of sheet metal for defining a base housing space when assembled with the metal frame; and a control unit for controlling the image reader unit and the image recorder unit, said control unit being mounted on the main body mounting plate in the base housing space.

3. The image forming apparatus according to claim 1, wherein a part of the image recorder unit is detachably mounted on the resin chassis.

4. The image forming apparatus according to claim 1, wherein the image reader unit includes a scanner.

5. The image forming apparatus according to claim 1, wherein the resin chassis is a one-piece member.

6. The image forming apparatus according to claim 1, wherein the image recorder unit includes:

an imaging assembly having a photoreceptor; and an exposure unit for exposing an image on the photoreceptor.

7. The image forming apparatus according to claim 6, wherein the imaging assembly further includes an imaging unit detachably mountable on the resin chassis, the imaging unit having a charger, a developing unit, and a cleaning unit.

8. A method of assembling an image forming apparatus comprising the steps of:

(a) forming a metal frame;

(b) forming a resin chassis by a resin molding process, the resin chassis having a space for transporting a copy sheet;

(c) mounting an image reader unit for reading an image of an original document on the metal frame;

(d) mounting an image recorder unit and a copy sheet guide on the resin chassis, the image recorder unit recording an image on a copy sheet passing along the copy sheet guide and in the space of the resin chassis based on image data read by the image reader unit or based on image data transmitted from an external device;

(e) assembling one structural unit obtained by step (c); and (f) assembling another structural unit obtained by step (d).

9. The assembling method according to claim 8, wherein the step c) and the step d) are performed concurrently.

10. The assembling method according to claim 8, wherein in the step (b), the resin chassis is molded into one-piece.

11. The assembling method according to claim 8, comprising providing the image recorder unit with:

an imaging assembly having a photoreceptor; and an exposure unit for exposing an image on the photoreceptor.

12. The assembling method according to claim 11, comprising providing the imaging assembly with an imaging unit detachably mountable on the resin chassis, the imaging unit having a charger, a developing unit, and a cleaning unit.

13. The assembling method according to claim 8, wherein the image reader unit includes a scanner.

14. An image forming apparatus comprising:

a frame main body including a metal frame structure and a resin chassis produced by a resin molding process;

an image reader unit mounted on the metal frame structure for reading an image of an original document;

an image recorder unit mounted on the resin chassis;

guides on the resin chassis defining a path of travel for a copy sheet, said path being substantially within the confines of said resin chassis;

said image recorder unit recording the image of the copy sheet moving along said path based on image data read by the image recorder or based on image data transmitted from an external device;

said resin chassis together with said image recorder unit and said guides forming a first sub-assembly unit, said metal frame structure and said image reader unit forming a second sub-assembly unit; and said connecting parts connecting said first sub-assembly unit and said second sub-assembly unit, said connecting parts include a first connecting part connected to said resin chassis on said first sub-assembly unit and a second connecting part connected to said first connecting part, said second sub-assembly unit being connected to said second connecting part.

15. The image forming apparatus according to claim 14 wherein said first connecting part is made of plastic and said second connecting member is made of metal.

16. The image forming apparatus according to claim 14 wherein said second connecting part is a metal plate.

17. A method for manufacturing an image forming apparatus comprising the steps of:

(a) forming a metal frame structure;

(b) mounting an image reader unit for reading an image of an original document on the metal frame structure to obtain a first sub-assembly;

(c) forming a resin chassis by a resin molding process;

(d) mounting an image recorder unit on the resin chassis to obtain a second sub-assembly having spaces defining an internal path for a copy sheet, the image recorder unit recording the image on the copy sheet based on image data read by the image reader unit or based on image data transmitted from an external device;

(e) assembling said first and second sub-assemblies utilizing connecting parts to obtain the image forming apparatus;

(f) said steps (a) and (b) together being designated a first manufacturing step for manufacturing said first sub-assembly and said steps (c) and (d) together being designated a second manufacturing step for manufacturing said second sub-assembly, and further comprising carrying out said first and second manufacturing steps substantially separately and substantially independently of one another;

(g) said step (e) being designated a third manufacturing step, said third manufacturing step being carried out after said first and second manufacturing steps have been substantially completed;

(h) said third manufacturing step including mounting said first sub-assembly on a first plastic part, mounting a second metal part on said first plastic part, and mounting said second sub-assembly on said second metal part.

18. A method according to claim 17 further comprising utilizing spaced rails as said first connecting part and utilizing a plate as said second connecting part.

19. A method for manufacturing an image forming apparatus comprising the steps of:

(a) forming a metal frame structure;

(b) mounting an image reader unit for reading an image of an original document on the metal frame structure to obtain a first sub-assembly;

(c) forming a resin chassis by a resin molding process;

(d) mounting an image recorder unit on the resin chassis to obtain a second sub-assembly having spaces defining an internal path for a copy sheet, the image recorder unit recording the image on the copy sheet based on image data read by the image reader unit or based on image data transmitted from an external device;

(e) assembling said first and second sub-assemblies utilizing connecting parts to obtain the image forming apparatus;

(f) said steps (a) and (b) together being designated a first manufacturing step for manufacturing said first sub-assembly and said steps (c) and (d) together being designated a second manufacturing step for manufacturing said second sub-assembly, and further comprising carrying out said first and second manufacturing steps substantially separately and substantially independently of one another;

(g) said step (e) being designated a third manufacturing step, said third manufacturing step being carried out after said first and second manufacturing steps have been substantially completed;

(h) said third manufacturing step including mounting said first sub-assembly on a first connecting part, mounting a second connecting part on said first connecting part, and mounting said second sub-assembly on said second connecting part.

* * * * *